(12) United States Patent
Jerdev et al.

(10) Patent No.: US 7,830,428 B2
(45) Date of Patent: Nov. 9, 2010

(54) METHOD, APPARATUS AND SYSTEM PROVIDING GREEN-GREEN IMBALANCE COMPENSATION

(75) Inventors: Dmitri Jerdev, South Pasadena, CA (US); Ilia Ovsiannikov, Studio City, CA (US)

(73) Assignee: Aptina Imaging Corporation, George Town (KY)

( * ) Notice: Subject to any disclaimer, the term of this patent is extended or adjusted under 35 U.S.C. 154(b) by 672 days.

(21) Appl. No.: 11/783,865

(22) Filed: Apr. 12, 2007

(65) Prior Publication Data

US 2008/0252759 A1   Oct. 16, 2008

(51) Int. Cl.
```
H04N 5/228    (2006.01)
H04N 5/217    (2006.01)
H04N 9/083    (2006.01)
H04N 3/14     (2006.01)
H04N 5/335    (2006.01)
H04N 9/04     (2006.01)
G06K 9/00     (2006.01)
```
(52) U.S. Cl. .................. 348/273; 348/222.1; 348/241; 382/162; 382/167
(58) Field of Classification Search ................ 382/272, 382/162–167; 348/222.1, 241, 251, 207.99, 348/266–283, 294–324; 358/518–523
See application file for complete search history.

(56) References Cited

U.S. PATENT DOCUMENTS

| | | | |
|---|---|---|---|
| 6,933,971 B2 | 8/2005 | Bezryadin | |
| 7,119,760 B2 | 10/2006 | Edge et al. | |
| 7,136,103 B2 | 11/2006 | Oeda et al. | |
| 2002/0122589 A1 | 9/2002 | Reiman et al. | |
| 2002/0131495 A1* | 9/2002 | Prakash et al. | 375/240.08 |
| 2002/0154813 A1 | 10/2002 | Stevenson et al. | |
| 2003/0184660 A1 | 10/2003 | Skow | |
| 2004/0052414 A1 | 3/2004 | Schroder | |
| 2005/0122408 A1 | 6/2005 | Park et al. | |
| 2005/0179825 A1* | 8/2005 | Hicks | 348/745 |
| 2005/0213128 A1 | 9/2005 | Imai et al. | |
| 2006/0013479 A1 | 1/2006 | Trimeche et al. | |
| 2006/0098868 A1 | 5/2006 | Fainstain et al. | |
| 2006/0164521 A1 | 7/2006 | Chikane et al. | |
| 2006/0239549 A1 | 10/2006 | Kelly et al. | |

(Continued)

FOREIGN PATENT DOCUMENTS

EP    096/1486    12/1998

(Continued)

OTHER PUBLICATIONS

Modeling of Color Cross-Talk in CMOS Image Sensors, Wanqing Li et al., VIP Lab, Motorola Australian Research Center, Australia, pp. IV-3576-79.

(Continued)

*Primary Examiner*—David L Ometz
*Assistant Examiner*—Richard Bemben

(57) ABSTRACT

Method, apparatus and system for determining a value for green-green imbalance and applying the value to green pixels to correct the imbalance are described. Average pixel values of green pixels within a kernel are calculated and an imbalance value is determined based on the averages. The imbalance value is added to or subtracted from all green pixel response values in the kernel to correct the imbalance.

56 Claims, 9 Drawing Sheets

U.S. PATENT DOCUMENTS

| | | |
|---|---|---|
| 2006/0245016 A1 | 11/2006 | Fukao et al. |
| 2006/0250623 A1 | 11/2006 | Newman et al. |
| 2006/0257022 A1 | 11/2006 | Hayaishi |
| 2006/0262198 A1 | 11/2006 | Une |
| 2006/0274160 A1 | 12/2006 | Cheng |
| 2006/0284991 A1 | 12/2006 | Ikeda |
| 2007/0002150 A1 | 1/2007 | Abe |
| 2007/0003136 A1 | 1/2007 | Shimbaru |
| 2007/0109316 A1* | 5/2007 | Fainstain .................... 345/600 |

FOREIGN PATENT DOCUMENTS

| | | |
|---|---|---|
| WO | WO 92/05470 | 4/1992 |
| WO | WO 99/39509 | 8/1999 |
| WO | WO 02/075654 A2 | 9/2002 |
| WO | WO 03/085963 | 10/2003 |
| WO | WO 2007/032824 A2 | 3/2007 |
| WO | WO 2007/054931 A2 | 5/2007 |

OTHER PUBLICATIONS

CMOS Sensor Cross-Talk Compensation for Digital Cameras, Wanqing Li, et al., Motorola Australian Research Center, Australia, IEEE Transactions on Consumer Electronics, vol. 48, No. 2, May 2002, pp. 293-297.

A CCD/CMOS Focal-Plane Array Edge Detection Processor Implementing the Multiscale Veto Algorithm, McIlath, IEEE Journal of Solid-State Circuits, vol. 31, No. 9, Sep. 1996, pp. IV-1239-47.

A 30-Frames/s Megapixel Real-Time CMOS Image Processor, Doswald Daniel et al., IEEE Journal of Solid-State Circuits, vol. 35, No. 11, Nov. 2000, pp. 1732-1743.

Concept of Color Correction on Multi-Channel CMOS Sensors, Henker Stephen et al., Proc. VII th Digital Image Computing: Techniques and Applications, Sun C., Talbot., Ourselin S. and Adriaansen T. (Eds.) Dec. 10-12, 2003, Sydney, pp. 771-780.

Crosstalk and Microlens Study in a Color CMOS Image Sensor, Gennadiy Agranov et al., IEE Transactions on Electron Devices, vol. 50, No. 1, Jan. 2003, pp. 4-11.

Color Filter Array and Color Correction for High Dynamic Range CMOS Image Sensors, Thorsten K. Heimann et al, ECCTD'01-European Conference on Circuit Theory and Design, Aug. 28-31, 2001, Espoo, Finland, pp. II-257-259.

Cross-talk correction methodology for color CMOS imagers, McCleary Brent, Raytheon Company, 2200 E. Imperial Hwy., El Segundo, CA USA 90245-0902, Digital Photogaphy, edited by Nitin Sampat, Jeffrey M. DiCarlo, Ricardo J. Motta, Proceedings of SPIE-IS&T Electronic Imaging, SPIE vol. 5678, 2005 SPIE and IS&T-0277-786X/05/$15, pp. 117-128.

* cited by examiner

US 7,830,428 B2

METHOD, APPARATUS AND SYSTEM PROVIDING GREEN-GREEN IMBALANCE COMPENSATION

FIELD OF THE INVENTION

Embodiments of the invention relate to a method, apparatus, and system for green-green imbalance compensation in imagers.

BACKGROUND OF THE INVENTION

Imagers, such as, for example, charge coupled devices (CCD), complementary metal oxide semiconductor (CMOS) and others, are widely used in imaging applications including digital still and video cameras. A CMOS imager circuit includes a focal plane array of pixels, each one of the pixels including a photosensor, for example, a photogate, photoconductor or a photodiode for accumulating photo-generated charge in the specified portion of the substrate. Each pixel has a charge storage region, formed on or in the substrate, which is connected to the gate of an output transistor that is part of a readout circuit. The charge storage region may be constructed as a floating diffusion region. In some imager circuits, each pixel may include at least one electronic device such as a transistor for transferring charge from the photosensor to the storage region and one device, also typically a transistor, for resetting the storage region to a predetermined charge level.

FIG. 1 shows one conventional CMOS pixel 10 having a four-transistor (4T) design, including pinned photodiode photosensor 20, floating diffusion region 30, reset transistor 40, transfer transistor 50, source follower transistor 60, and row select transistor 70. Transfer transistor 50 is controlled by signal TX, reset transistor 40 is controlled by signal RST and row select transistor 70 is controlled by signal SEL. In a CMOS imager circuit, the active elements of pixel 10 perform the functions of: (1) photon to charge conversion; (2) accumulation of image charge; (3) resetting the floating diffusion region 30 to a known state (e.g., Vaa-pix); (4) transfer of charge to the floating diffusion region 30; (5) selection of the pixel 10 for readout; and (6) output and amplification of signals representing pixel reset level and pixel charge. Photo charge may be amplified when it moves from the initial charge accumulation region in the photosensor 20 to the floating diffusion region 30. The charge at the floating diffusion region 30 is typically converted to a pixel output voltage by the source follower transistor 60 and output onto a column output line 72 (via row select transistor 70).

FIG. 2 illustrates a block diagram of a CMOS imager circuit 208 having a pixel array 200 where each pixel in the array 200 may be constructed as described above. Pixel array 200 comprises a plurality of pixels 10 arranged in a number of columns and rows. The pixels 10 of each row in array 200 are all turned on at the same time by a row select line, and the pixels 10 of each column are selectively output onto column output lines by respective column select lines. A plurality of row and column select lines are provided for the entire array 200. The row lines are selectively activated in sequence by the row driver 210 in response to row address decoder 220 and the column select lines are selectively activated in sequence for each row activated by the column driver 260 in response to column address decoder 270. Thus, a row and column address is provided for each pixel 10. The imager circuit 208 is operated by the control circuit 250, which controls address decoders 220, 270 for selecting the appropriate row and column select lines for pixel readout, and row and column driver circuitry 210, 260, which apply driving voltage to the drive transistors of the selected row and column select lines. Alternatively, multiple columns may be activated at the same time if readout circuits are provided for each column.

The pixel output signals typically include a pixel reset signal, Vrst, taken off the floating diffusion region 30 when it is reset by reset transistor 40 and a pixel image signal, Vsig, which is taken off the floating diffusion region 30 after charges generated by photosensor 20 are transferred to it (thru transfer transistor 50). The Vrst and Vsig signals are sampled by the sample and hold circuit 265 and then subtracted by a differential amplifier 267 that produces a signal Vrst−Vsig for each pixel, which represents the amount of light impinging on the pixels 10. This difference signal is digitized by an analog-to-digital converter (ADC) 275. The digitized pixel signals are fed to an image processor 280, which performs various processing on the digital signals to form a digital image. The digitizing and image processing can be performed on or off the chip containing the pixel array 200.

In order for the imager circuit 208 to successfully capture color differential in a color image, the pixels 10 must be able to detect separate color components of a captured image. Separate color detection is often accomplished by placing a color filter array (CFA) above the pixel array 200 so that each pixel receives only the light of the color of its associated filter according to a specific pattern.

A Bayer color filter array 80, illustrated in FIG. 3, is an exemplary color filter array which can be used. It has an arrangement of color filters to allow the passage of red, green or blue light to respective pixels 10 beneath a filter. Pixels 10 in an array 200 associated with a Bayer color filter array 80 are therefore typically designated as red (R), green (G), or blue (B) pixels according to each pixels' associated filter. That is, a red pixel is a pixel covered by a red filter, a blue pixel is a pixel covered by a blue filter and a green pixel is a pixel covered by a green filter. The Bayer color filter array 80 color ratio is designed to mimic the human eye's propensity to detect more green light than red or blue light, and accordingly comprises a distribution of 50% green pixels, 25% red pixels and 25% blue pixels. Pixels 10 under a Bayer filter 80 are arranged in a pattern of alternating rows 90, 95, 90, 95 having R,G,R,G,R,G pixels and B,G,B,G,B,G pixels, as shown in FIG. 3.

The main objective of a color filter array is to limit the spectral range of light detection of each pixel 10 to a single color in the form of a wavelength range designated by the pixel's associated filter. However, light sometimes passes through an individual color filter at such an angle that it strikes a neighboring pixel and affects the neighboring pixel's detection response. This undesirable occurrence, often referred to as "cross-talk," is illustrated in FIG. 4. A row 90 of color filters is aligned over a row 100 of pixels. A portion of the light 110 passing through a red filter 115 at an oblique angle reaches a pixel 10G that is designated by the CFA 80 to detect green light (i.e., a green pixel).

When cross-talk such as this occurs throughout a Bayer-filter patterned pixel array, green pixels neighboring red pixels are impinged by an unwanted amount of red-filtered light, while green pixels neighboring blue pixels are impinged by unwanted blue-filtered light. Due to the difference between the effects of the red and blue cross-talk, two distinctly different detection levels or "channels" of green exist where there should be uniformity. This difference, called "green-green imbalance," can manifest as unwanted artifacts in a digitally captured photo, such as the appearance of a faint checkerboard pattern overlaying the image. Green-green imbalance can be particularly damaging when employing edge-sensitive demosaicing algorithms wherein the imbalance causes false edge defection, resulting in the appearance of distinct "labyrinth lines" of random short orthogonal edges. As pixel sizes grow smaller, the effects of cross-talk and green-green imbalance worsen. There is a need to reduce the effects of green-green imbalance.

DETAILED DESCRIPTION OF THE INVENTION

In the following detailed description, reference is made to the accompanying drawings which form a part hereof, and in which are shown by way of illustration specific embodiments of the invention. These embodiments are described in sufficient detail to enable those skilled in the art to make and use them, and it is to be understood that structural, logical or procedural changes may be made. Particularly, in the description below, processing is described by way of flowchart. In some instances, steps which follow other steps may be in reverse or in a different sequence except where a following procedural step requires the presence of a prior procedural step. The processes illustrated in the flowcharts can be implemented as a pixel processing circuit provided in as part of an image processor 280 (FIG. 2) of a solid state imager device. The pixel processing circuit can be implemented using hardware components forming a pixel processing pipeline, a processor executing a program, or other signal processing hardware and/or processor structures or any combination thereof. The processing circuit may also be a separate stand alone processor, e.g. a personal computer, executing a program stored on a storage medium which receives directly or through a storage medium pixel image data from image processor 280 or from A/D converter 275.

In the following description, the embodiments are described in relation to a CMOS image sensor for convenience purposes only. However, the described embodiments may have a wider applicability to any imager, including charge-coupled device (CCD) imagers and others.

According to embodiments described herein, green-green imbalance may be addressed by digitally correcting an image during image processing based on local green pixel image information in a kernel of pixels. A value representing the magnitude of the green-green imbalance is calculated to adjust the output value of at least one green pixel within the kernel and preferably all given pixels within the kernel, thereby compensating for the imbalance.

Figure 5A:
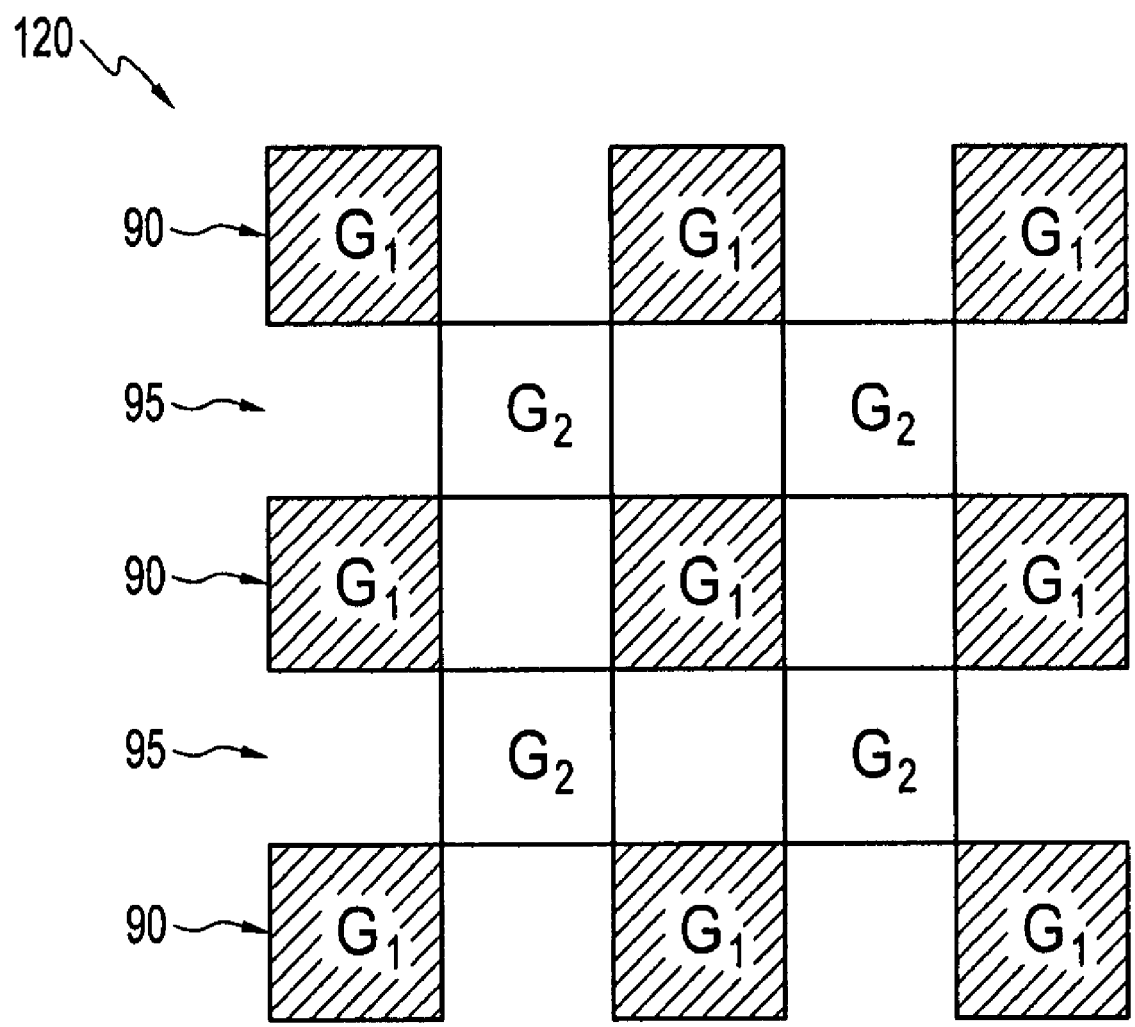
FIG. 5A is a layout of a 5×5 kernel of green pixels.
Figure 5B:
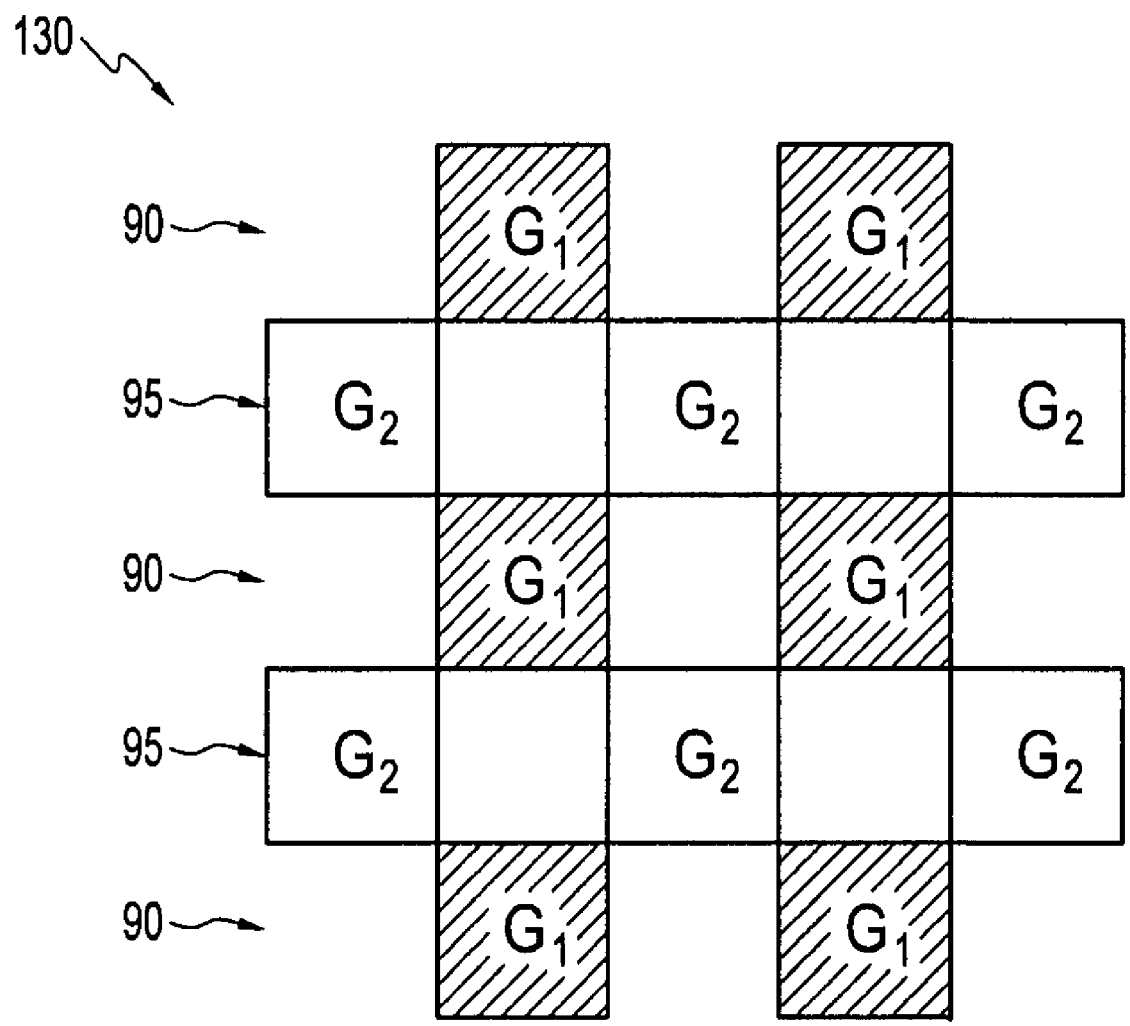
FIG. 5B is a second layout of a 5×5 kernel of green pixels.

FIGS. 5A and 5B show layouts of green pixels in two possible 5×5 pixel kernel configurations 120, 130 which may be used in embodiments of the invention described herein. Kernels 120, 130 are illustrated as 5×5 pixel kernels for illustrative purposes only and can be any other size or shape as desired (described further below). Green pixels G1 in rows 90 alternate with red pixels (not shown) and are subject to mostly potential red cross-talk. These pixels may also be referred to as green 1 pixels G1. Green pixels G2 in rows 95 alternate with blue pixels (not shown) and are subject to mostly potential blue cross-talk. These pixels may also be referred to as green 2 pixels G2. There is a potential green-green imbalance between green 1 and 2 pixels G1,G2.

A kernel 120 or 130 limits a sampling of pixel outputs to a selection of local values to estimate green-green imbalance. The kernels 120, 130 may be used separately in embodiments of the invention, with kernel 120 containing X, e.g. 9, green 1 pixels G1 and Y, e.g. 4, green 2 pixels G2, and with kernel 130 containing an equal number, e.g. 6, of green 1 pixels G1 and green 2 pixels G2.

Figure 6:
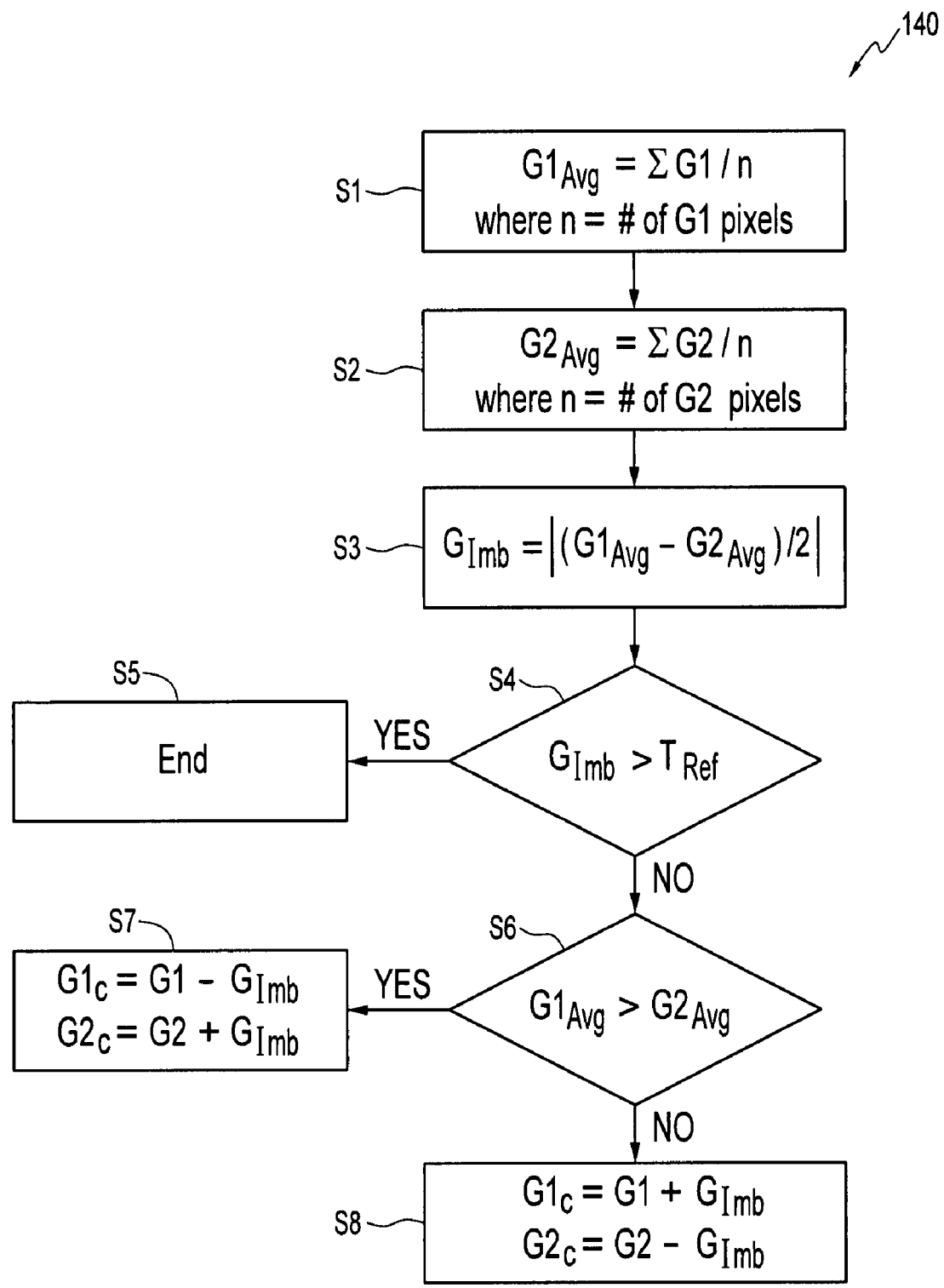
FIG. 6 is a flowchart of a process for compensating green-green imbalance in accordance with disclosed embodiments.

FIG. 6 shows a flowchart illustrating a process 140 for determining a value for green-green imbalance and applying the value to at least one green pixel output signal value within a kernel according to one embodiment. At step S1, an average value $G1_{Avg}$ of the pixel signals from all green 1 pixels G1 in one of the kernels 120 or 130 is calculated as: $G1_{Avg} = \Sigma G1/n$, where n is the number of green 1 pixels G1. The average value $G2_{Avg}$ for all green 2 pixels G2 within a kernel 120 or 130 is calculated at step S2 as: $G2_{Avg} = \Sigma G2/n$, where n is the number of green 2 pixels G2. Next, an imbalance value $G_{Imb}$ equal to $|(G1_{Avg} - G2_{Avg})/2|$ is calculated at step S3.

At step S4 the imbalance value $G_{Imb}$ is compared to a predetermined threshold $T_{Ref}$ to determine whether the imbalance value $G_{Imb}$ should be applied to at least one pixel within the kernel 120 or 130. If $G_{Imb} > T_{Ref}$, then the imbalance value $G_{Imb}$ is not applied. The comparison with $T_{Ref}$ ensures that pixels G1, G2 within a kernel 120 or 130 which may include a significant amount of image edge pixels are not adjusted. When calculating $G_{Imb}$ in a kernel 120 or 130 with high image edge content, it is difficult to distinguish contributions to the G1, G2 values inherent from the image edge content from actual green-green imbalance. Accordingly, for pixels G1, G2 within a kernel 120 or 130 which exhibits an unusually high imbalance value $G_{Imb}$, signified by exceeding the threshold $T_{Ref}$, the processing ends at step S5. The threshold $T_{Ref}$, which determines the cutoff level for excluding image edge pixels, can be set by experimenting to obtain the best perceptual image quality. $T_{Ref}$ can be changed depending on the conditions of the camera operation on-the-fly. For example, in the low-light conditions it can be increased. It is highly desirable to correct all of the pixels in the kernel since down-stream processing algorithms such as demosaic, for example, use valves from several green pixels on each step.

For a kernels 120 or 130 in which step S4 evaluates as $G_{Imb} < T_{Ref}$, the process 140 continues with imbalance correction adjustment at step S6. $G1_{Avg}$ is compared to $G2_{Avg}$ to determine which green pixels G1 or G2 have the higher average output. If $G1_{Avg} > G2_{Avg}$, then corrected values G1c,G2c of at least one and preferably all green 1 and 2 pixels G1,G2 are calculated at step S7 as follows: $G1c = G1 - G_{Imb}$, $G2c = G2 + G_{Imb}$. Otherwise, if $G1_{Avg} < G2_{Avg}$, then corrected G1c,G2c for at least one and preferably all green 1 and 2 pixels G1,G2 within the kernel 120 or 130 are calculated at step S8 as follows: $G1c = G1 + G_{Imb}$, $G2c = G2 - G_{Imb}$. Accordingly, each pixel within a kernel 120 or 130 is adjusted by $G_{Imb}$ to compensate for green-green imbalance. The process may then be repeated, successively moving the kernel 120 or 130 throughout a captured image until all green pixels in the array have been adjusted. Since the kernel size includes more than one pixel, each green pixel will be corrected several times.

The above described process 140 is appropriate for compensation of green-green imbalance in images where the noise magnitude is less than that of the green-green imbalance. However, if it is determined that the noise magnitude is greater than the green-green imbalance, the above process 140 may be compromised due to random contributions of the noise to ΣG1 and ΣG2 in a kernel 120 or 130. This problem may be addressed by increasing the size of the kernel 120 or 130. Calculating more accurate $G1_{Avg}$, $G2_{Avg}$ values over a greater number of green pixels G1,G2 decreases the effect of the noise contribution on the $G_{Imb}$ calculation and increases the accuracy and reliability of the value $G_{Imb}$. In the case where all the pixels in the kernel are corrected, the original data should remain unmodified. Thus, each corrected kernel is only used once and results of correction are discarded. If the results of correction are not discarded as described, $G_{Imb}$ may be calculated incorrectly due to feedback into the original data from the previous correction steps.

In certain applications of the process 140, the processing hardware to expand the size of the kernel 120 or 130 may be limited to a maximum dimension A×B. If this maximum limit is reached and a more accurate $G_{Imb}$ calculation is desired, the FIG. 7 process 150 embodiment for determining the imbalance value $G_{Imb}$ may be used. The process 150 factors in more pixels G1,G2 than would be possible by the limited kernel 120 or 130 size. Steps S9-S11 are executed to determine an initial imbalance value $G_{New}$ similar to steps S1-S3 (described above). In order to factor in the average value of pixels G1,G2 outside of a current kernel 120 or 130, $G_{Imb}$ is calculated at step S12 as follows: $G_{Imb}=(\alpha*G_{Tmp})+(\beta*G_{New})$, where $G_{Tmp}$ is a temporary stored imbalance value that is carried from a prior kernel to a subsequent kernel and improved upon in each subsequent imbalance calculation, and α and β are weighting constants selected such that α+β=1. Steps S13-S17 are executed similar to steps S5-S8 described above. The $G_{Imb}$ value is stored in the temporary variable $G_{Tmp}$ at step S18, and the process continues as a kernel is moved to a next location of a captured image.

Figure 7:
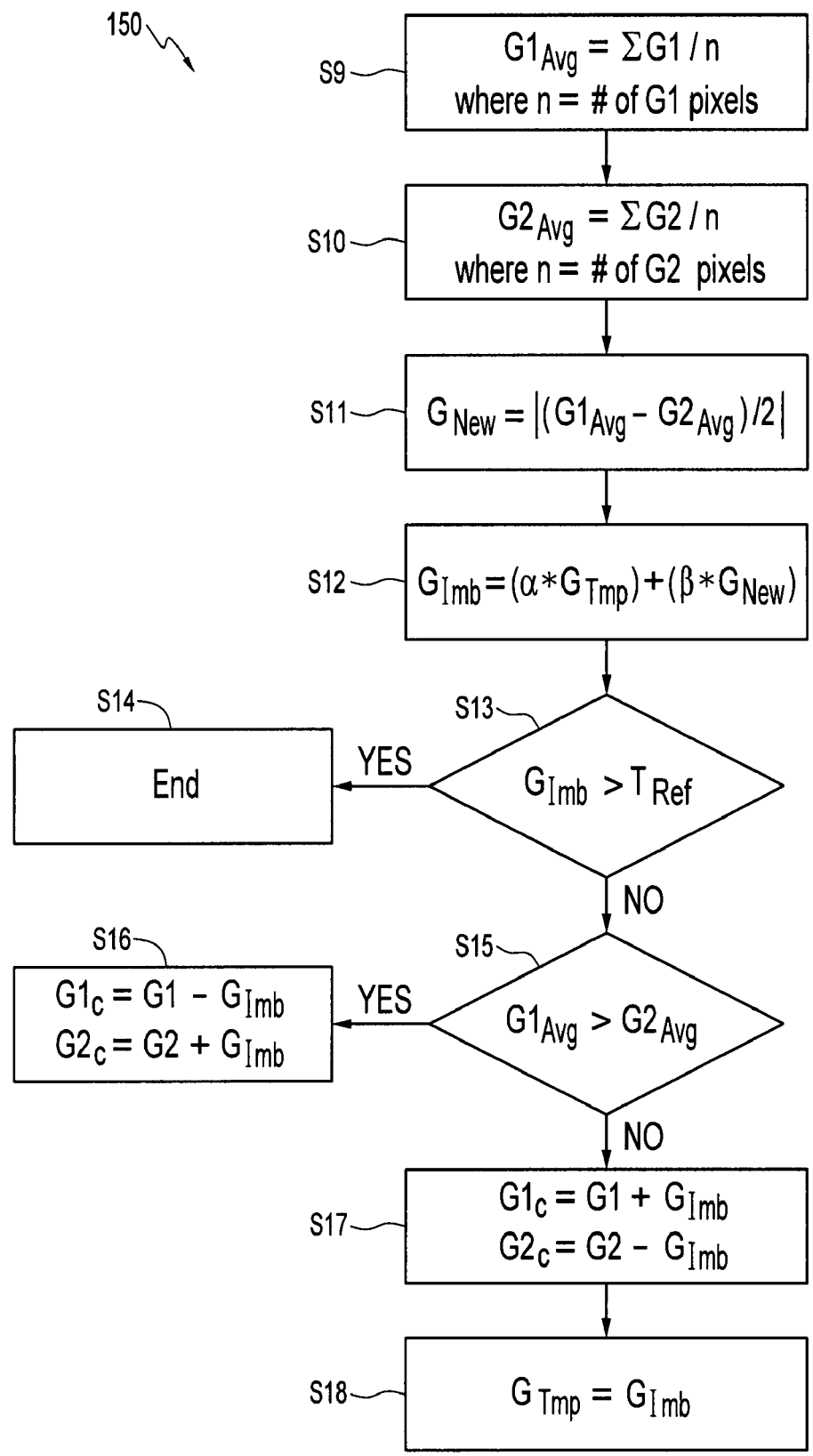
FIG. 7 is a flowchart of a process for compensating green-green imbalance with a fixed kernel size in accordance with disclosed embodiments.

The accuracy of the imbalance value $G_{Imb}$ will increase as the processing moves through the array according to the FIG. 7 embodiment. Weighting constants α and β may be adjusted to further increase the $G_{Imb}$ accuracy. For example, initially α could equal β, with α steadily decreasing and β steadily increasing as $G_{Tmp}$ grows increasingly accurate. Pixel outputs evaluated earlier may be revisited and further adjusted for improved results.

Embodiments may be implemented as part of a camera such as e.g., a digital still or video camera, or other image acquisition system.

Figure 1:
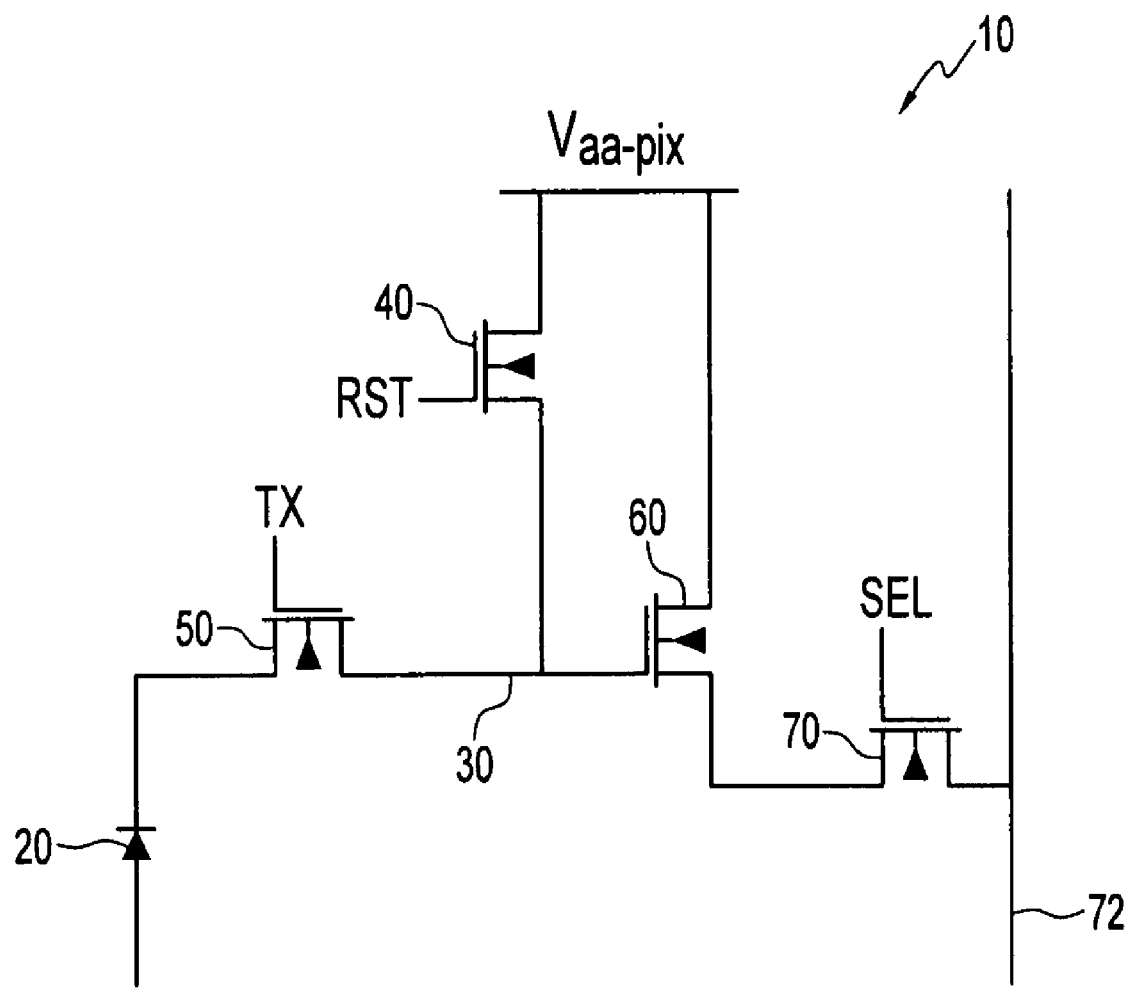
FIG. 1 is a four-transistor pixel.
Figure 2:
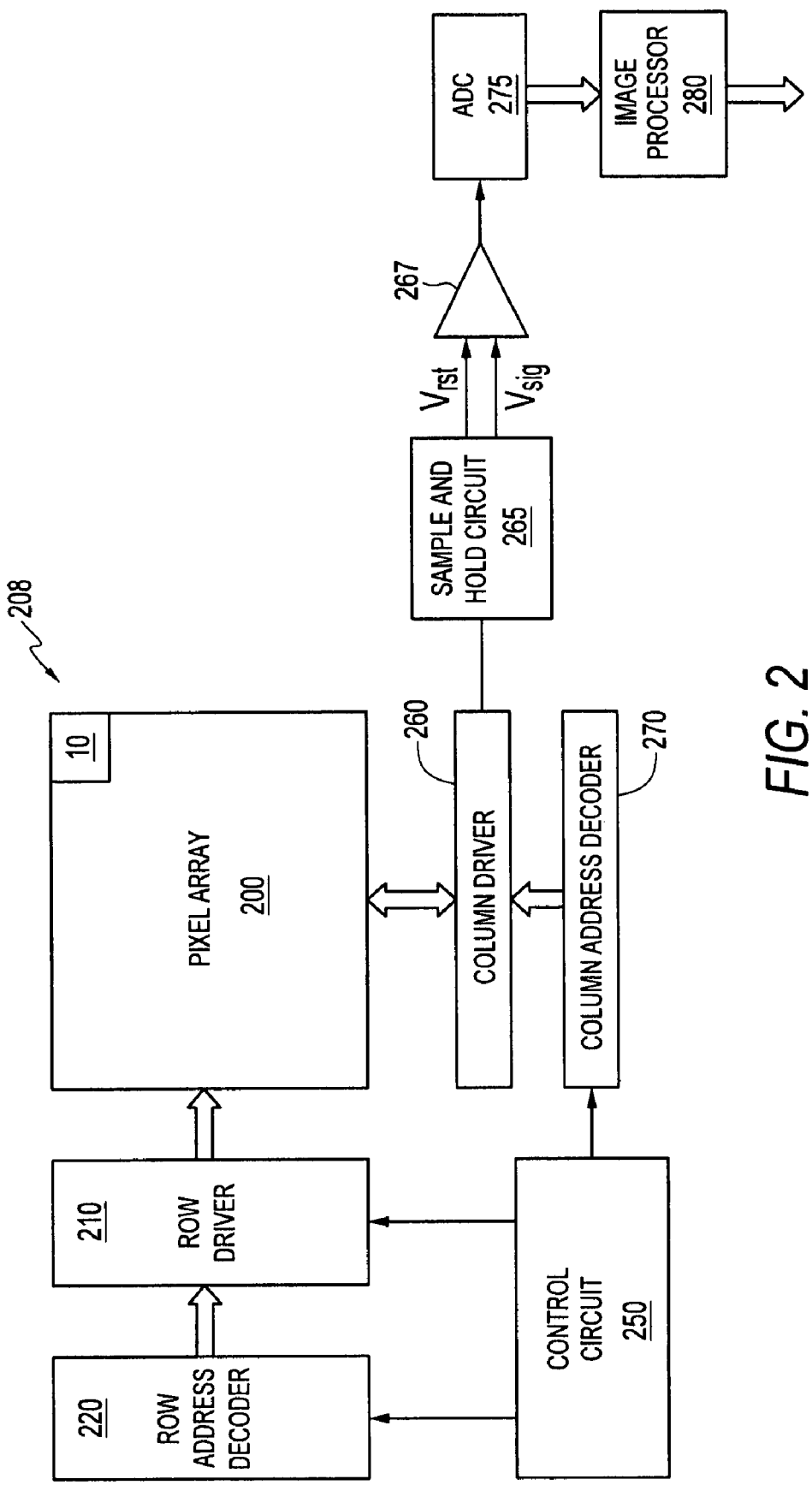
FIG. 2 is a CMOS imager circuit.
Figure 3:
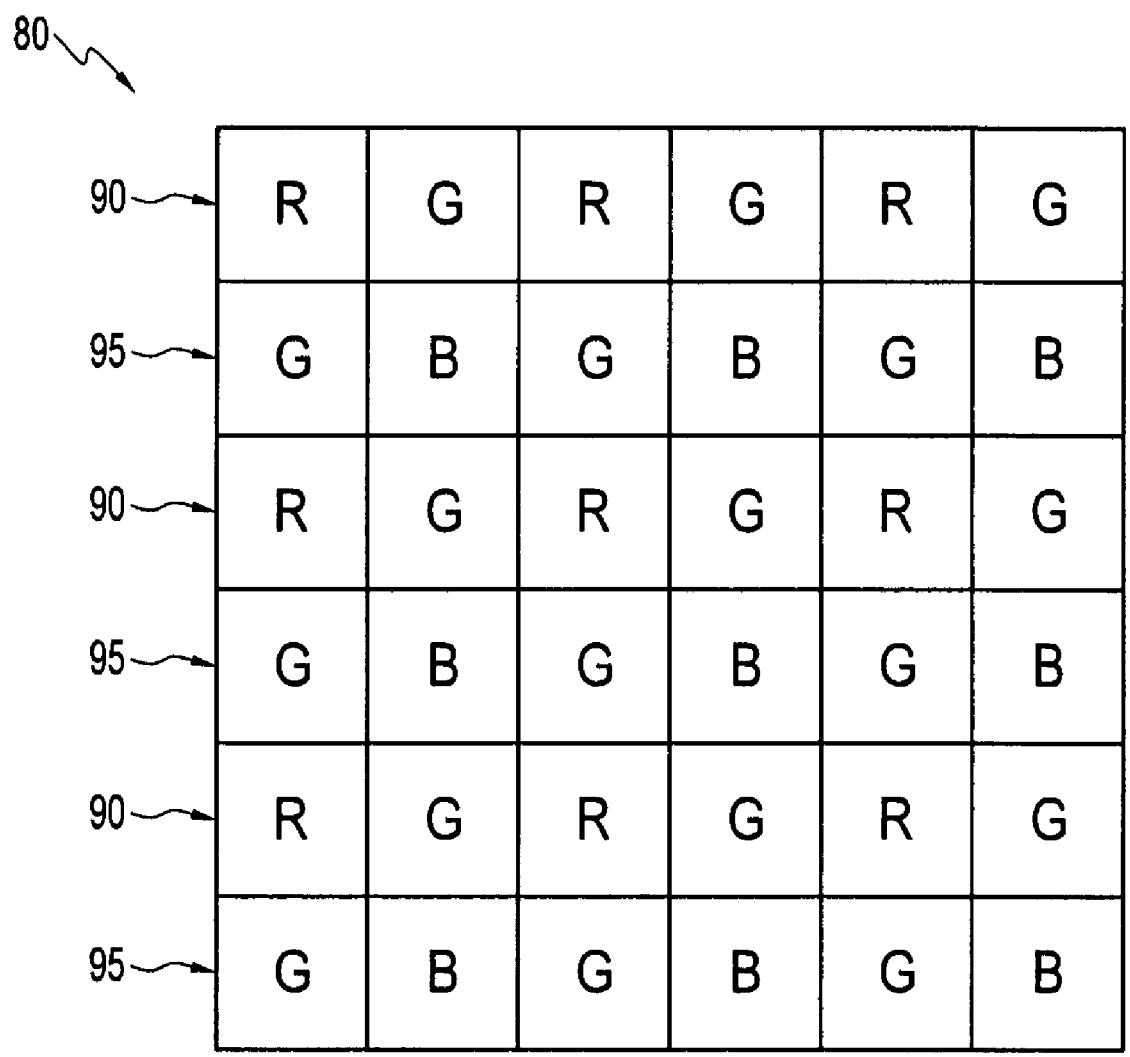
FIG. 3 is a Bayer-pattern color filter array.
Figure 4:
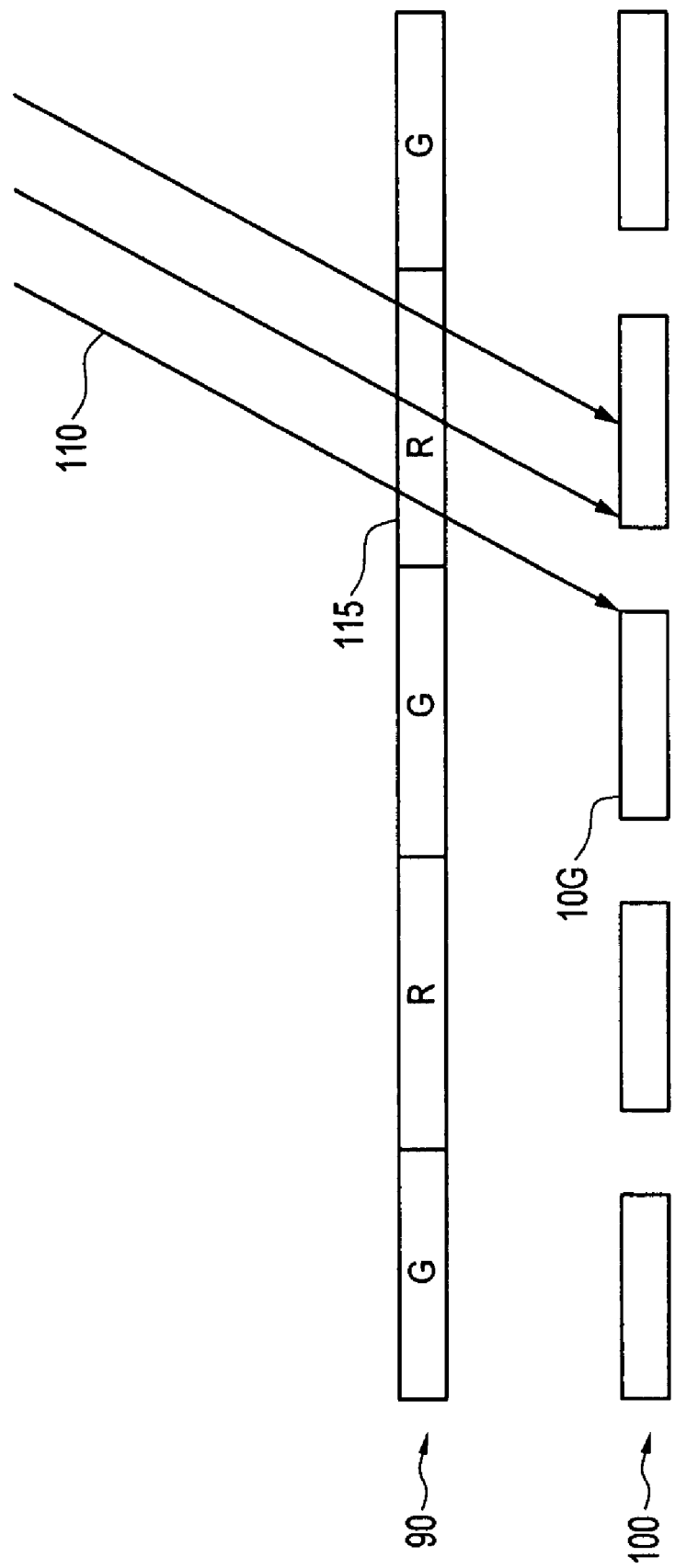
FIG. 4 is a side cross-sectional view of a row of pixels and filters, illustrating the cross-talk effect.
Figure 8:
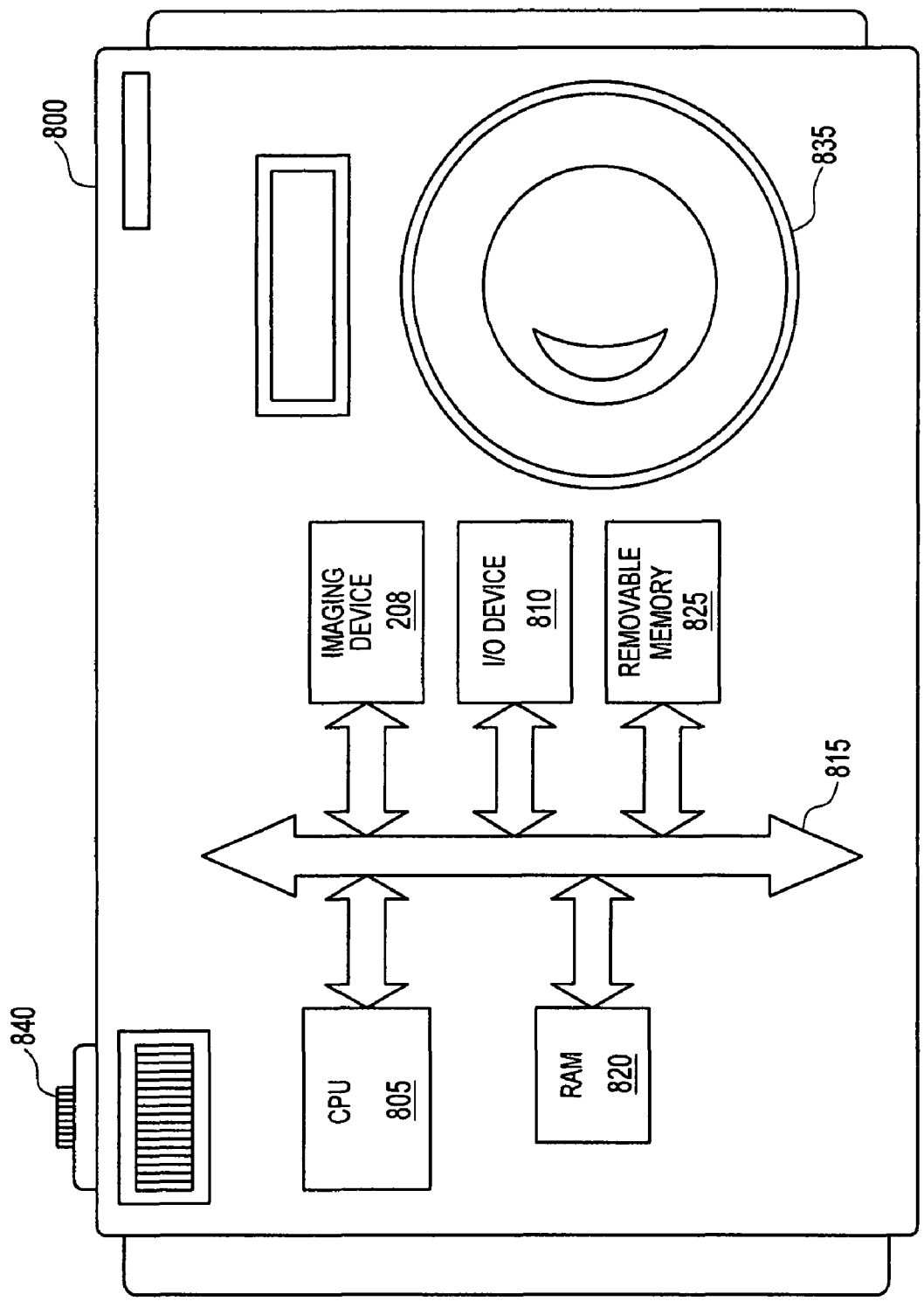
FIG. 8 is a processing system, for example, a digital still or video camera system, constructed in accordance with disclosed embodiments.

FIG. 8 illustrates a processor system as part of, for example, or digital still or video camera system 800 employing a imager circuit 208 as illustrated in FIG. 2 in which the imager circuit 208 provides green-green imbalance compensation as described above. The processing system includes a processor 805 (shown as a CPU) which implements system, e.g. camera 800, functions and also controls image flow. The processor 805 is coupled with other elements of the system, including random access memory 820, removable memory 825 such as a flash or disc memory, one or more input/output devices 810 for entering data or displaying data and/or images, and imager circuit 208 through bus 815 which may be one or more busses or bridges linking the processor system components. Camera 800 further includes a lens 835 and a shutter release button 840 for allowing light corresponding to an image to reach the pixel array of image circuit 208 when the button 840 is pressed.

The camera system 800 is one example of a system having digital circuits that could include an imager circuit 208. Without being limiting, such a system could also include a computer system, image, scanner, machine vision, vehicle navigation, video phone, surveillance system, auto focus system, star tracker system, motion detection system, image stabilization system, and other systems which acquire and process image data.

While embodiments have been described in detail, it should be readily understood that the invention is not limited to the disclosed embodiments. Rather the embodiments can be modified to incorporate any number of variations, alterations, substitutions or equivalent arrangements not heretofore described.

What is claimed as new and desired to be protected by Letters Patent of the United States is:

1. A method of compensating for green-green imbalance in an image captured by a pixel array, comprising:
    obtaining a pixel output signal for each green pixel in a kernel of pixels of the image captured by the pixel array;
    calculating a green-green imbalance value from each green pixel output signal value associated with the kernel;
    adjusting a pixel output value for each green pixel within the kernel by applying the green-green imbalance value; and
    outputting the adjusted pixel output value for each green pixel within the kernel.

2. The method of claim 1, wherein applying the green-green imbalance value comprises subtracting the imbalance value from the output values of pixels within a first set of green pixels and adding the imbalance value to output values of pixels within a second set of green pixels.

3. The method of claim 2, wherein the imbalance value is based on a difference between average pixel output values of green pixels within the first set and analogous values for green pixels within the second set.

4. The method of claim 3, wherein the imbalance value is equal to one half of said difference.

5. The method of claim 3, wherein the green pixels within the first set are green pixels in rows alternating green and red pixels.

6. The method of claim 3, wherein the green pixels within the second set are green pixels in rows alternating green and blue pixels.

7. The method of claim 1, wherein the kernel is a 5.times.5 pixel kernel.

8. The method of claim 2, wherein the number of pixels in the first set is equal to the number of pixels in the second set.

9. The method of claim 2, wherein the number of pixels in the first set is not equal to the number of pixels in the second set.

10. The method of claim 1, wherein the imbalance value is selectively applied based on a comparison of average green pixel output values in a first set of pixels within the kernel to average green pixel output values in a second set of pixels within the kernel.

11. The method of claim 1, further comprising:
    storing a calculated imbalance value for a kernel of pixels in a temporary imbalance value variable;
    calculating a current imbalance value for a next kernel of pixels;
    calculating a new imbalance value as equal to: (α*temporary imbalance value variable)+(β*current imbalance value), where α and β are predetermined values;
    determining a final pixel output value for each green pixel in the next kernel by subtracting the new imbalance value from the output values of pixels within a first set of green pixels within the kernel and adding the new imbalance value to output values of pixels within a second set of green pixels within the kernel; and storing a new temporary imbalance value variable equal to the new imbalance value.

12. The method of claim 11, wherein .alpha. and .beta. are selected such that $\alpha+\beta=1$.

13. The method of claim 11, further comprising processing all green pixels outputs in the captured image by repeating the steps for subsequent new kernels at different locations of the image.

14. The method of claim 1 further comprising processing all green pixel output in the captured image by repeating the steps for subsequent new kernels at different locations of the image.

15. The method of claim 11, wherein the temporary imbalance value is stored from kernel to kernel, and is updated in the step of storing a new temporary imbalance value.

16. The method of claim 15, further comprising comparing the new imbalance value to a threshold prior to determining a final pixel output value for each green pixel in the determining step and proceeding to the next kernel if the new imbalance value is greater than the threshold.

17. A method of compensating for green-green imbalance in an image captured by a pixel array, comprising:
    obtaining a pixel output signal for each green pixel in a kernel of pixels of the captured image;
    calculating a green-green imbalance value from each green pixel output signal value associated with the kernel of pixels of the captured image;
    adjusting each green pixel output value within the kernel by applying the green-green imbalance value to the pixel output signal value when the imbalance value is greater than a threshold value; and
    outputting the adjusted green pixel output value for each green pixel within the kernel.

18. The method of claim 17, wherein applying the green-green imbalance value comprises subtracting the imbalance value from the output values of pixels within a first set of green pixels and adding the imbalance value to output values of pixels within a second set of green pixels.

19. The method of claim 18, wherein the imbalance value is based on a difference between average pixel output values of green pixels within the first set and green pixels within the second set.

20. The method of claim 19, wherein the imbalance value is equal to one half of said difference.

21. The method of claim 17, wherein the kernel is a 5×5 pixel kernel.

22. A method of compensating for green-green imbalance in a image captured by a pixel array, comprising:
    determining a first average pixel output value of a first set of green pixels in a kernel of pixels of an image captured by the array;
    determining a second average pixel output value of a second set of green pixels in the kernel;
    comparing the first average pixel output value with the second average pixel output value to determine a higher average pixel output value and a lower average pixel output value;
    determining an imbalance value based on the difference between the higher average pixel output value and the lower average pixel output value;
    setting the imbalance value equal to zero when the imbalance value is greater than a threshold value;
    determining a final output value of pixels in the set of green pixels having the lower average output value by adding the imbalance value to the corresponding pixel output value; and
    determining a final output value of pixels in the set of green pixels having the higher average output value by subtracting the imbalance value from the corresponding pixel output value.

23. The method of claim 22, wherein the imbalance value is equal to one half of the difference between the higher average pixel output value and the lower average pixel output value.

24. The method of claim 23, wherein the green pixels in the first set are in rows of pixels having alternating green and red pixels.

25. The method of claim 23, wherein the green pixels in the first set are in rows of pixels having alternating green and blue pixels.

26. The method of claim 23, wherein the number of pixels in the first set is equal to the number of pixels in the second set.

27. The method of claim 23, wherein the number of pixels in the first set is not equal to the number of pixels in the second set.

28. The method of claim 23, wherein the first and second sets of green pixels are selected from within an A×B pixel kernel, wherein A=5 and B=5.

29. A method of compensating for green-green imbalance in an image captured by a pixel array, comprising:
    obtaining a pixel output signal for a plurality of green pixels within a kernel of pixels in the captured image;
    storing a calculated imbalance value for the kernel of pixels of the image in a temporary imbalance value variable;
    calculating a current imbalance value for a next kernel of pixels;
    calculating a new imbalance value as equal to: ($\alpha$*temporary imbalance value variable)+($\beta$*current imbalance value), where $\alpha$ and $\beta$ are predetermined values; determining a final pixel output value for each green pixel in the next kernel by subtracting the new imbalance value from the output values of pixels within a first set of green pixels within the kernel and adding the new imbalance value to output values of pixels within a second set of green pixels within the kernel;
    storing a new temporary imbalance value variable equal to the new imbalance value; and
    outputting the final pixel output value for each green pixel in the next kernel.

30. The method of claim 29, wherein $\alpha$ and $\beta$ are selected such that $\alpha+\beta=1$.

31. The method of claim 29, further comprising processing all pixels outputs in the captured image by repeating the steps for subsequent new kernels.

32. The method of claim 29, wherein the temporary imbalance value is stored from kernel to kernel, and is updated in the step of storing a new temporary imbalance value.

33. The method of claim 32, further comprising comparing the new imbalance value to a threshold prior to determining a final pixel output value for each green pixel in the determining step and proceeding to a subsequent kernel without correcting imbalance in the current kernel if the new imbalance value is greater than the threshold.

34. The method of claim 31, wherein the current imbalance value is calculated as equal to one half of the difference in average pixel output values between two exclusive sets of green pixels within the respective kernels.

35. An imaging device, comprising:
a color pixel array;
a processor for processing captured image pixel output signals received from the pixel array, the processor being configured to:
calculate a green-green imbalance value based on a difference in average pixel output signal values between two exclusive sets of green pixels associated with a kernel of the captured image, where a first set has a higher average pixel output value and a second set has a lower average pixel output value; and
adjust the pixel output value for each green pixel in the kernel by applying the imbalance value.

36. The imaging device of claim 35, wherein applying the imbalance value comprises subtracting the imbalance value from the output values of pixels within the first set and adding the imbalance value to output values of pixels within the second set.

37. The imaging device of claim 35, wherein the imbalance value is equal to one half of the difference between the average pixel value of pixels within the first set and the average pixel value of pixels within the second set.

38. The imaging device of claim 35, wherein the green pixels in the first set are from rows of pixels having alternating green and red pixels.

39. The imaging device of claim 35, wherein the green pixels in the second set are from rows of pixels having alternating green and blue pixels.

40. An imaging device, comprising:
a pixel array;
a processor for processing captured image pixel output signals received from the pixel array, the processor being configured to:
store a calculated imbalance value for a kernel of pixels in a temporary imbalance value variable;
calculate a current imbalance value for a next kernel of pixels; calculate a new imbalance value as equal to: ($\alpha$*temporary imbalance value variable)+($\beta$*current imbalance value), where $\alpha$ and $\beta$ are predetermined values;
determine a final pixel output value for each green pixel in the next kernel by subtracting the new imbalance value from the output values of pixels within a first set of green pixels within the kernel and adding the new imbalance value to output values of pixels within a second set of green pixels within the kernel; and store a new temporary imbalance value variable equal to the new imbalance value.

41. The imaging device of claim 40, wherein $\alpha$ and $\beta$ are selected such that $\alpha+\beta=1$.

42. The imaging device of claim 40, further comprising processing all pixels outputs in the captured image by repeating the steps for subsequent new kernels.

43. The imaging device of claim 40, wherein the temporary imbalance value is stored from kernel to kernel, and is updated in the step of storing a new temporary imbalance value.

44. The imaging device of claim 43, further comprising comparing the new imbalance value to a threshold prior to determining a final pixel output value for each green pixel in the determining step and proceeding to a subsequent kernel without subtracting or adding the imbalance value to the pixel output values of the current kernel if the new imbalance value is greater than the threshold.

45. The imaging device of claim 42, wherein the current imbalance value is calculated as equal to one half of the difference in average pixel output values between two exclusive sets of green pixels within the respective kernels.

46. A digital camera system, comprising:
a pixel array for capturing an image received through a lens;
a processor circuit for processing pixel signals received from the pixel array, the processor circuit being configured to:
calculate an imbalance value based on a difference in average pixel output values between two exclusive sets of green pixels associated with a kernel, where a first set has a higher average pixel output value and a second set has a lower average pixel output value; and
adjust pixel output for each green pixel in the kernel by applying the imbalance value to each pixel output value.

47. The digital camera system of claim 46, wherein the application of the imbalance value comprises subtracting the imbalance value from the output values of pixels within the first set and adding the imbalance value to output values of pixels within the second set.

48. The digital camera system of claim 46, wherein the imbalance value is equal to one half of the difference between the average pixel value of pixels within the first set and the average pixel value of pixels within the second set.

49. The digital camera system of claim 46, wherein the green pixels selected in the first set are in rows of alternating green and red pixels.

50. The digital camera system of claim 46, wherein the green pixels in the second set are in rows of alternating green and blue pixels.

51. A storage medium containing a program for a processor, said program when executed by said processor performing the acts of:
determining a first average pixel output value representing a first set of green pixels in a kernel of a captured image;
determining a second average output value representing a second set of green pixels in the kernel; comparing the first average output value with the second average output value to determine a higher average output value and a lower average output value;
determining an imbalance value based on the difference between the higher average output value and the lower average output value; setting the imbalance value equal to zero when the imbalance value is greater than a threshold value;
determining final output values representing pixels in the set of green pixels having the lower average output value by adding the imbalance value to the corresponding output values; and
determining final output values representing pixels in the set of green pixels having the higher average output value by subtracting the imbalance value from the corresponding output values.

52. The storage medium of claim 51, wherein the imbalance value is equal to one half of the difference between the higher average output value and the lower average output value.

53. A storage medium containing a program for execution by a processor, said program when executed by the processor causing the processor to perform the acts of:
storing a calculated imbalance value for a kernel of pixels in a temporary imbalance value variable;
calculating a current imbalance value for a next kernel of pixels; calculating a new imbalance value as equal to:

($\alpha$*temporary imbalance value variable)+($\beta$*current imbalance value), where $\alpha$ and $\beta$ are predetermined values;

determining a final pixel output value for each green pixel in the next kernel by subtracting the new imbalance value from the output values of pixels within a first set of green pixels within the kernel and adding the new imbalance value to output values of pixels within a second set of green pixels within the kernel; and storing a new temporary imbalance value variable equal to the new imbalance value.

54. The storage medium of claim 53, wherein $\alpha$ and $\beta$ are selected such that a +$\beta$=1.

55. The storage medium of claim 53, further comprising processing all pixels outputs in the captured image by repeating the steps for subsequent new kernels.

56. The storage medium of claim 55, wherein the temporary imbalance value is stored from kernel, and is updated in the determining step.

* * * * *